United States Patent

Sundhar

[11] Patent Number: 5,365,162
[45] Date of Patent: Nov. 15, 1994

[54] LIGHT BULB ELECTRIC LIFE EXTENDER HAVING A DIACTRIAC COMBINATION CONNECTER IN PARALLEL WITH A CAPACITOR

[76] Inventor: Shaam P. Sundhar, c/o 87 Juniper Ave., Westerville, Ohio 43081

[21] Appl. No.: 910,725

[22] Filed: Jul. 8, 1992

[51] Int. Cl.5 .............................................. H02M 1/00
[52] U.S. Cl. .................................... 323/320; 323/324
[58] Field of Search ............... 323/237, 238, 239, 320, 323/321, 324

[56] References Cited

U.S. PATENT DOCUMENTS

| | | | |
|---|---|---|---|
| 3,896,369 | 7/1975 | Nakata | 323/238 |
| 4,008,416 | 2/1977 | Nakasone | 323/321 |
| 4,031,458 | 6/1977 | Ichikawa | 323/324 |
| 4,350,931 | 9/1982 | Niskin | 315/72 |
| 4,638,226 | 1/1987 | Damiano et al. | 323/324 |
| 4,680,536 | 7/1987 | Roszel et al. | 323/321 |
| 4,743,834 | 5/1988 | Rice | 323/239 |
| 4,878,010 | 10/1989 | Weber | 323/324 |
| 4,888,678 | 12/1989 | Sundhar | 363/146 |
| 5,030,890 | 7/1991 | Johnson | 323/238 |

*Primary Examiner*—Jeffrey L. Sterrett
*Attorney, Agent, or Firm*—Biebel & French

[57] ABSTRACT

An electric bulb saver is provided for use with light bulb sockets in either 110 V or 220 V screw type or bayonet circuits. The device includes circuitry comprising a resistor, a capacitor and a rectifier. The circuitry may also include in specified combinations, thermistors, a bridge rectifier, as well as additional resistors, capacitors, and rectifiers. The circuit may be housed in a socket, wall switch or plug, in an on-line connection, or in a device attached to the socket.

4 Claims, 3 Drawing Sheets

LIGHT BULB ELECTRIC LIFE EXTENDER HAVING A DIACTRIAC COMBINATION CONNECTER IN PARALLEL WITH A CAPACITOR

BACKGROUND OF THE INVENTION

This invention relates to an energy saving device and more particularly to one which reduces power consumption by electric light bulbs or lamps, thereby prolonging their life.

The use of direct current as well as reduced RMS voltage to extend the life of an incandescent light bulb is well known. In many such devices, a half-wave rectifier is secured to the base of a light bulb prior to the bulb's insertion into a conventional socket. By reducing the effective voltage applied to the bulb filament by imposing a lower effective voltage thereupon, the operating life of the bulb is substantially extended, in some cases enabling a bulb to operate for a period of time many times greater than its ordinary expected life. An example of this type of device is shown in Niskin, U.S. Pat. No. 4,350,931. Another similar device is shown in Sundhar, U.S. Pat. No. 4,888,678.

Regardless of the type of bulb for which electric bulb savers have been designed, a number of shortcomings have typically presented themselves. First, the brightness of the lamp is drastically diminished. Second, many of the devices have become dislodged from the bulb base and upon removal of the bulb from the socket for insertion of a replacement bulb therein, the device may become stuck in the socket so as to preclude its successful orientation with respect to the replacement bulb and the electrical connections of the socket. This problem is acerbated when a large or weighty lamp is involved and the socket is upwardly facing. An additional problem arises when dealing with 220 V bulbs, since they are designed to be pressed into their socket and then rotated approximately 15°. The combination of pressure and subsequent twisting tends to permit relative movement between the rectifier unit and its electrical contact, which may result in the bulb not working properly.

Therefore it is apparent that the need exists for a simple, yet dependable electric bulb saver.

SUMMARY OF THE INVENTION

In accordance with this invention, an electrical bulb saver having in its circuitry a thyristor such as a triac, a diac or the combination "quadrac", capacitors, resistors, and NTC thermistor as well as a bridge, rectifier is provided for advantageous use with incandescent light bulbs. Preferably one of the resistors is directly connected to the bridge rectifier in the control circuit.

In one modified embodiment of the invention the circuitry includes in addition to a resistor, a thyristor and a capacitor, a second thyristor and a thermistor. In yet another modified embodiment of the invention the electrical circuitry includes two thermistors, three resistors, three thyristors and two capacitors. A third modified embodiment includes the components of the first modified embodiment plus a photo resistor. In all three embodiments of the invention the two rectifiers are preferably a diac and a triac. Still further the thermistor is of the type known as a negative temperature coefficient thermistor (NTC thermistor).

The primary objective of this invention is to provide an electric bulb saver that significantly prolongs the life of light bulbs used with either 220 V or 110 V circuits.

Another objective is the providing of an improved an electric bulb saver which can because of its circuitry be easily secured in a socket, or alternatively either as an on-line connection, for example in a junction box, or in an "EXIT SIGN" or in a device which can be electrically as well as mechanically connected to a socket, or wall switch or plug.

Yet another objective is to provide an improved socket which not only prolongs the life of the bulb, but also automatically turns the bulb "on" at dusk and "off" at dawn.

These and other objects and advantages of this invention will be apparent from the following description, the accompanying drawings and the appended claims.

DETAILED DESCRIPTION OF THE INVENTION

Figure 1:
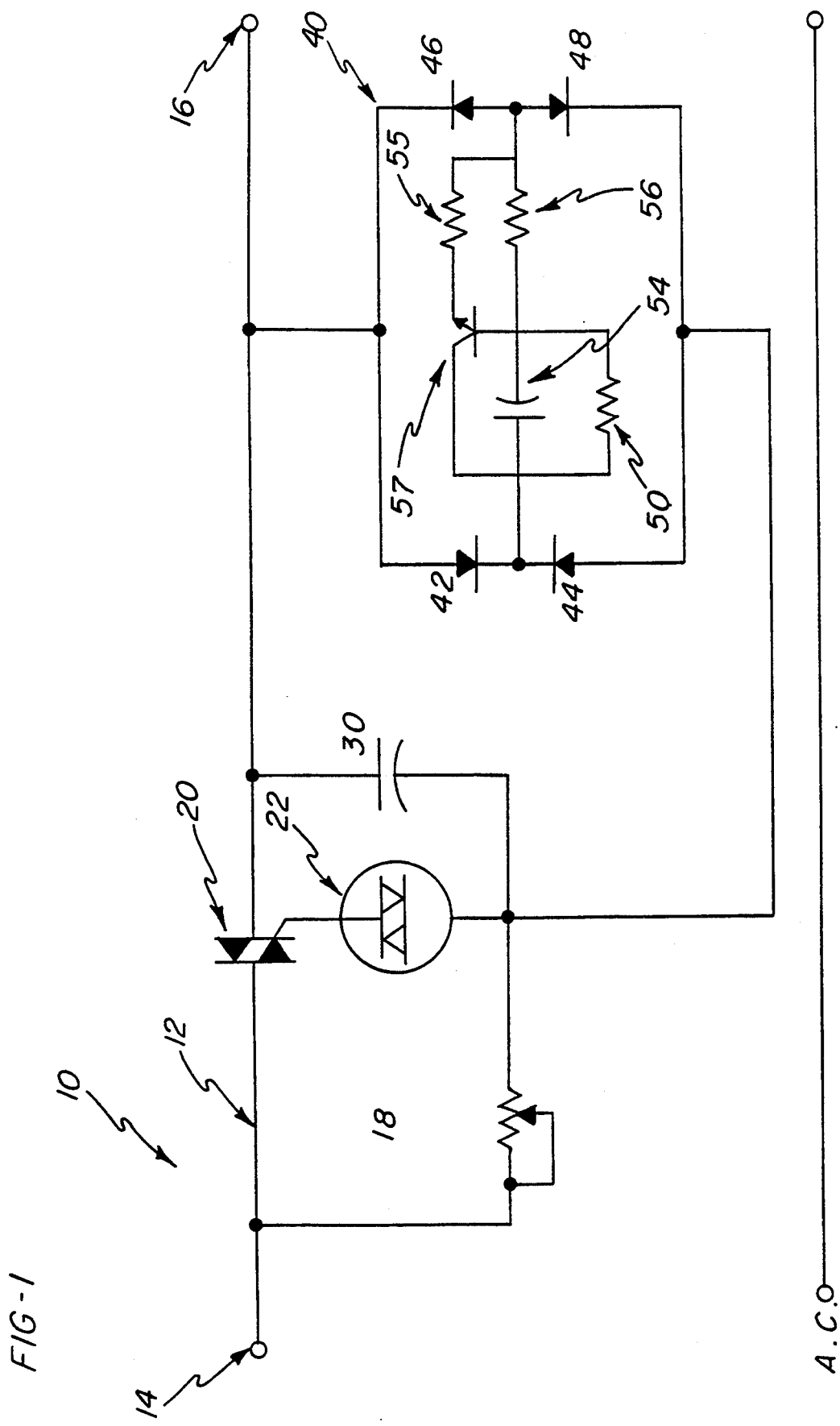
FIG. 1 is a schematic of the electrical circuitry associated with the preferred embodiment of the invention.

Having reference to the drawings, attention is directed first to FIG. 1 which illustrates an electric bulb saver embodying this invention and designated generally by the numeral 10. This bulb saver comprises electrical circuitry having the preferred embodiment shown in FIG. 1, with this preferred embodiment comprising, as do the other embodiments of this invention, resistors, capacitors, rectifiers and thyristors.

In the preferred embodiment of the invention shown in FIG. 1, the bulb saver 10 has electrical circuitry 12, which has a current source connecting end 14 as well as a bulb connecting end 16. Resistor 18 is of suitable value, and in the preferred embodiment of the invention is a 360K resistor. Connected to the resistor is a diac, having a $V_b$ of approximately 30 to 55 volts. Preferably this diac is similar to a Teccor HT35-91 of the type without lead formation. Also electrically connected to the diac is a triac 20 which is preferably 4 to 10 Amp triac having a $V_{drm}$ equal to 200 and 400 volts. The triac is similar to a Teccor Q2004F41.

The electrical circuitry also comprises a capacitor, preferably a high temperature rated capacitor. The preferred circuit of the invention may also include yet another resistor 32 of suitable value, which is the preferred embodiment of the invention is 1 milli to 100K.

Connected to resistor 32 and capacitor is a bridge rectifier 40, comprising four rectifiers 42, 44, 46 and 48. It should be noted that a component of this bridge rectifier is a bleeder resistor 50, which in the preferred embodiment is a 10M ohm resistor. Additionally, the bridge rectifier 40 comprises a capacitor 54 of the type similar to a Spargney Hi Temp, 517D106, M050JA7A sold by Newark Electronics or a Cornell Dubber 22GA100P050XX. Two additional resistors 55 and 56 are connected to a regular transistor 57, as shown in the circuit diagram.

Figure 2:
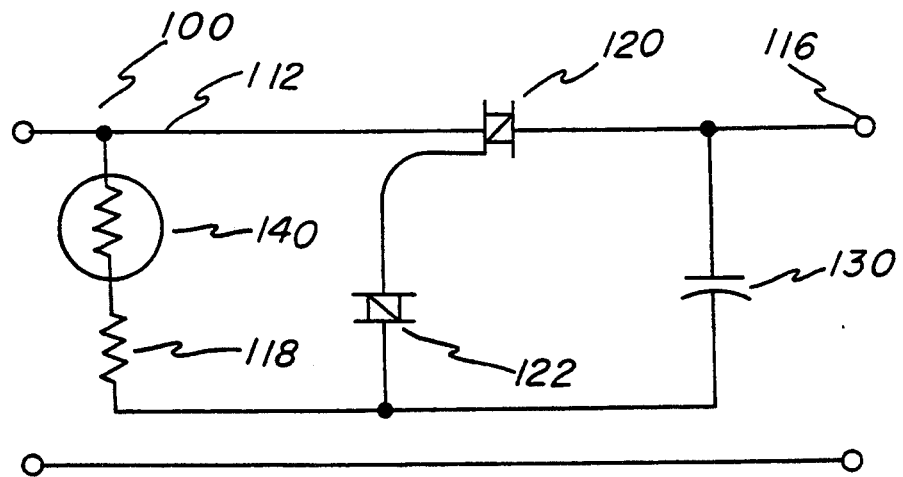
FIG. 2 discloses modified electrical circuitry associated with an alternative embodiment of the invention.
Figure 3:
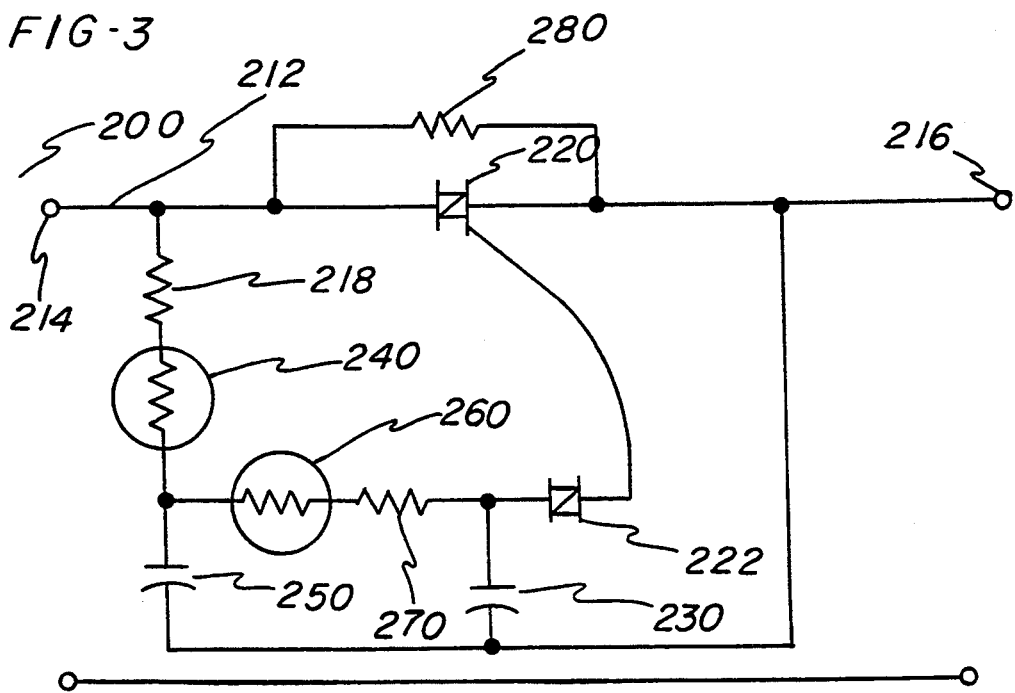
FIG. 3 discloses modified electrical circuitry associated with yet another alternative embodiment of the invention.

In the first modified embodiment of the invention shown in FIG. 2, the bulb saver 100 once again has its current source end 114 and bulb end 116. The circuitry 112 again includes a resistor 118, a triac 120, similar to Teccor Q2004F41 and a diac 122, similar to the Teccor HT35-91. Additionally, it would be appreciated that in this modified embodiment of the invention the electrical circuitry 112 also includes a capacitor 130 which is preferably of the high temperature type. Still further there is shown a thermistor 140 having a low resistance at room temperature, preferably 100K ohms at 25° C. Preferably this resistor is of the type known as a negative temperature coefficient thermistor (NTC). Preferably the thermistor is directly connected to resistor 118, just as the diac 122 and triac 120 are directly connected to each other.

In the third embodiment of the invention the bulb saver 200 and its electrical circuitry 212 has a current source end 214 and a bulb end 216. Again, the resistor 218 is shown, but this particular resistor is a $\frac{1}{4}$ to $\frac{1}{2}$ watt 50 to 220K, resistor with the resistor in the preferred embodiment being a $\frac{1}{4}$ watt 120K, resistor. A triac 220, which triac is similar to a Teccor Q200423 with a $V_{drm}$ equal to 200 to 400 volts and an $I_f$ of 4 to 8 Amps, however the value in the preferred embodiment are 200 volts and 4 Amps respectively. Directly connected to the triac is a diac which in this case is similar to a General Electric STU having a Vbr equal to 35–45 volts.

Once again, the circuitry 212 has a capacitor 230, preferably of the 200 volt ceramic type, and also with a preferred value of 0.01 mf, as well as the NTC thermistor 240. A source for this thermistor 240 is Keystone PNRL1004-104.7K-15501 or a similar thermistor. Thermistor 240 is directly connected to the resistor 218. In addition to capacitor 230, the third embodiment of the invention includes another capacitor 250 which is also a high temperature capacitor.

Figure 4:
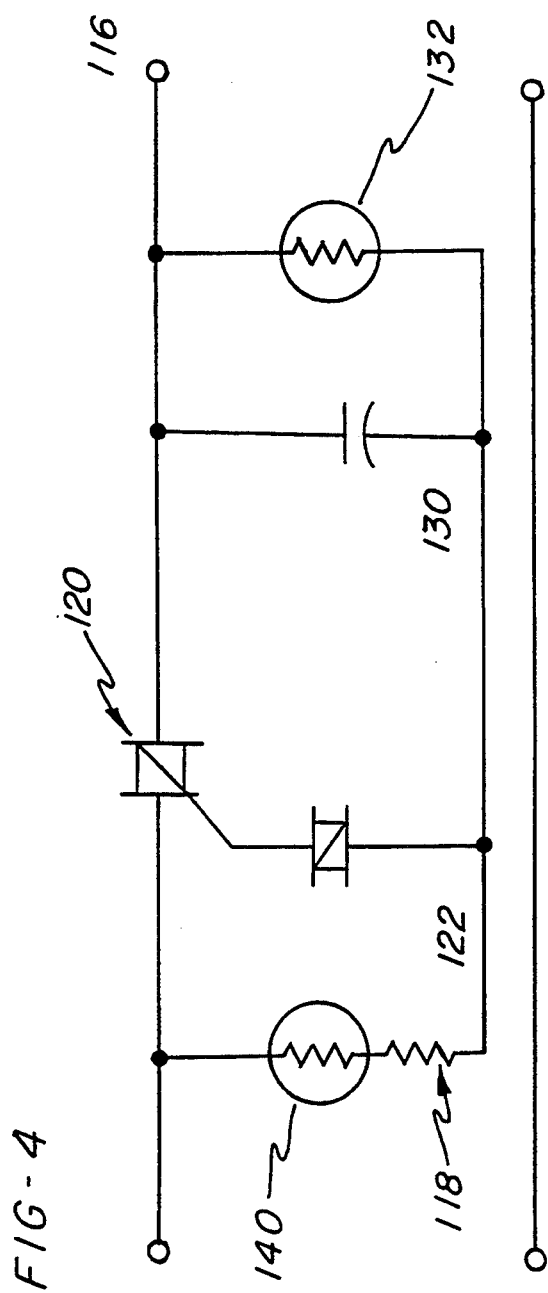
FIG. 4 discloses modified electrical circuitry associated with yet another alternative embodiment of the invention which includes automatic nights "on" and days "off" feature.

This embodiment also has a second thermistor 260 of the same type as thermistor 240. Thermistor 260 is directly connected to resistor 270 which once again is a $\frac{1}{4}$ to $\frac{1}{2}$ watt 50K resistor, with the preferred embodiment having values of $\frac{1}{4}$ watt and 120K respectively. The electrical circuitry 212 of this embodiment of the invention includes a heating resistor 280 which in this case is a $\frac{1}{4}$ watt 8.2K resistor. The fourth embodiment, or third modified embodiment is disclosed in FIG. 4. This embodiment has the same circuitry as is shown in FIG. 1 with the exception being that a photo resistor 132 has been added. This permits the bulb to be turned "on" and "off" automatically in response to the presence of adequate light.

The electric bulb saver of this invention may have its electrical circuitry incorporated as a component of an electrical socket, wall switch or plug, or be part of an on-line connection, such as by way of a junction box a traffic signal control box or exit sign. Additionally, the circuitry could be embodied in a separate device, such as in a molded thermoplastic, which device is secured to a socket both electrically as well as mechanically.

The use of thermistors as well as the R-C bridge rectifier in the various embodiments of the invention impact on the stress the bulb encounters when the initial rush of current occurs due to the filament's "cold resistance." These circuit elements interact with the circuitry to result in a gradual increase in the current, thereby providing the bulb with a "soft start" which assists in prolonging the life of the light bulb. Otherwise, if the filament is weak, the normal switching on of the bulb may cause the filament to break. It should also be appreciated that the various diacs and triacs associated with the various embodiments of this invention could be replaced by the type of thyristor known as a quadrac.

As a result of using this invention the RMS voltage associated with the electrical circuits of this invention is reduced as compared to circuits which are typically utilized in the wiring of incandescent light bulbs. The unique circuitry associated with Applicant's invention results in a decreased RMS value, which in turn means that, according to the well known formula for calculating the life of a bulb, the life of the bulb will increase.

It will be readily apparent from the foregoing detailed description of the preferred embodiment and the several modifications thereof that a particularly novel and extremely effective bulb saver is provided. The device is relatively simple to fabricate, however, it results in a device which provides a significant increase in extension of bulb life while increasing the dependability of this type of unit over bulb savers previously known. Dependability is increased as a result of the providing of an invention which can be incorporated into the wiring of an electrical circuit as opposed to being fabricated as a separate electronic item for placement adjacent a bulb as discussed above with reference to the prior art and its deficiencies.

Also the various embodiments of the bulb saver circuit of this invention act as a "shock absorber" for the inrush current when bulb is turned on. The circuit of this invention permits the current to increase gradually thereby giving a "soft start" which enhances the life of the bulb.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. An electrical bulb saver for use with light bulbs, said bulb saver having an electrical circuit comprising a resistor, a capacitor, two thyristors, said two thyristors being directly connected to each other, and said resistor being directly connected to one of said two thyristors, said capacitor being directly connected to one of said two thyristors, and a photo resistor, and a rectifier.

2. The bulb saver according to claim 1 wherein said two thyristors are a diac and a triac.

3. An electrical bulb saver for use with light bulbs, said bulb saver having an electrical circuit comprising resistors, capacitors, rectifiers, two thyristors, said two thyristors being directly connected to each other, said resistor being directly connected to one of said two thyristors, said capacitor being directly connected to one of said two thyristors, transistors and a photo resistor.

4. The bulb saver according to claim 3 wherein said two thyristors are a diac and a triac.

* * * * *